Sept. 15, 1959 H. S. STANTON 2,904,032
WEED BURNER
Filed Jan. 31, 1955 2 Sheets-Sheet 1
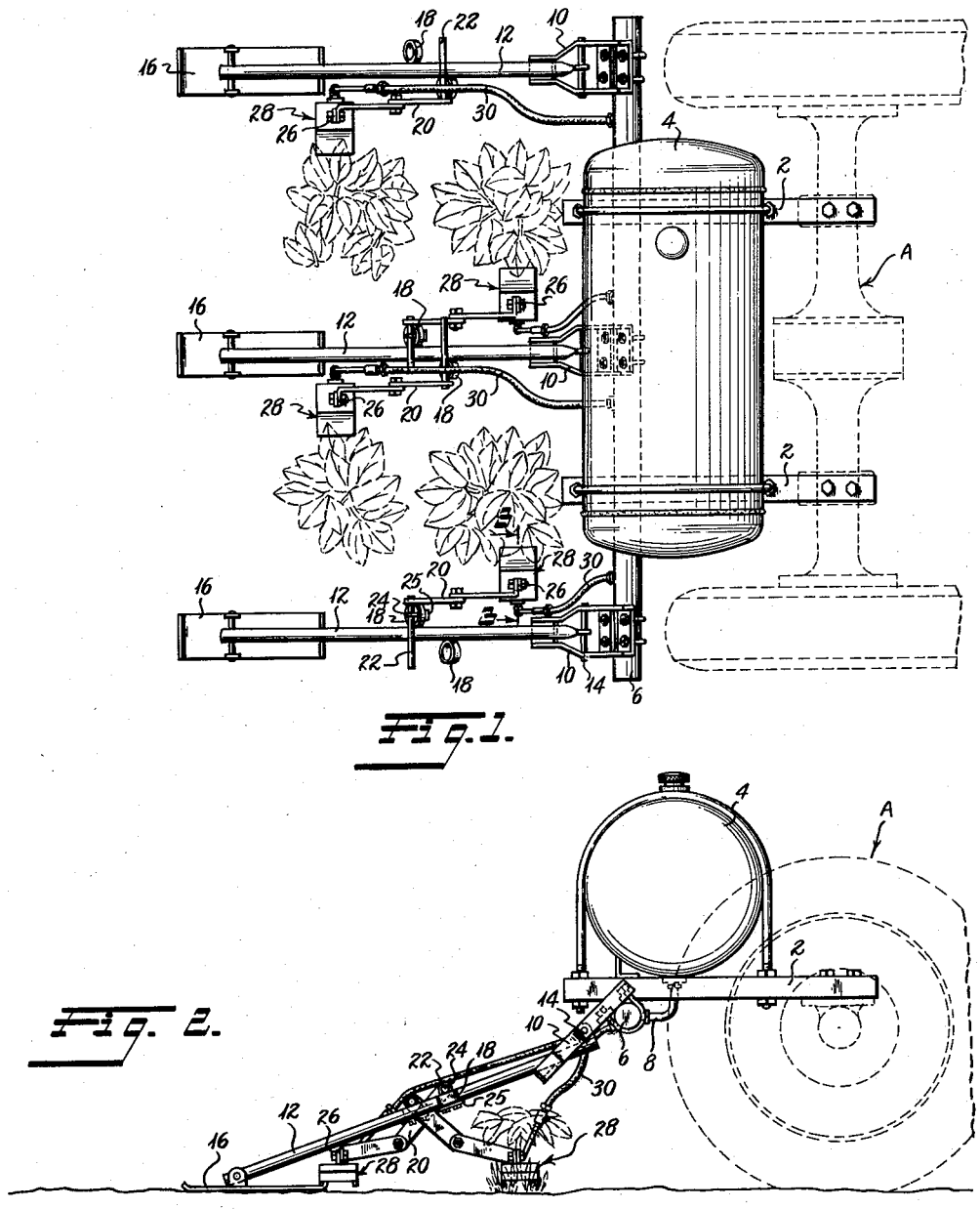
INVENTOR
HAROLD S. STANTON
BY
ATTORNEYS Sept. 15, 1959     H. S. STANTON     2,904,032
WEED BURNER
Filed Jan. 31, 1955     2 Sheets-Sheet 2
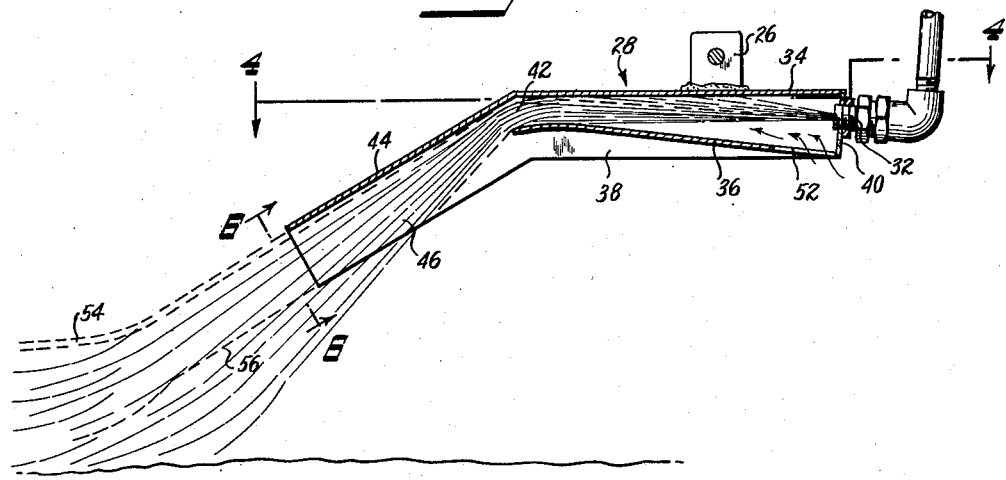
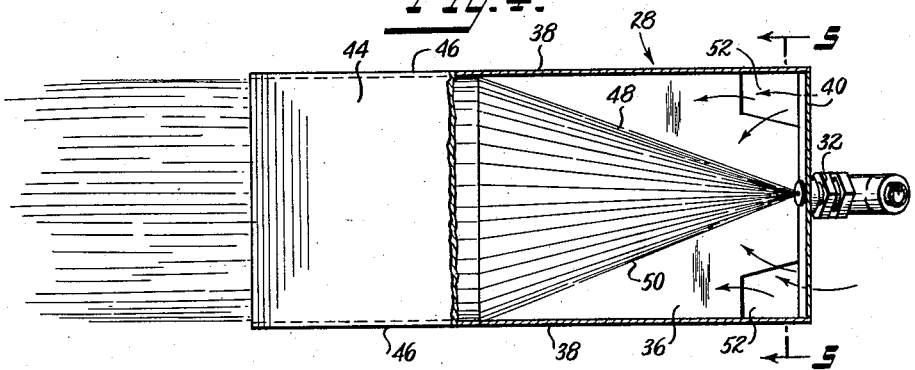
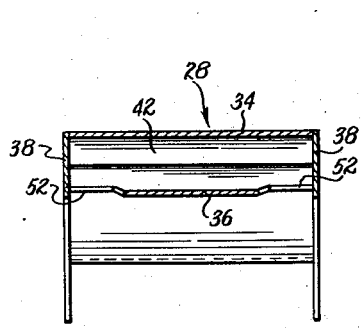
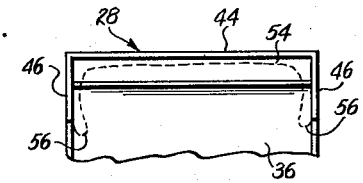
INVENTOR
HAROLD S. STANTON
BY *Bacon & Thomas*
ATTORNEYS

United States Patent Office 2,904,032
Patented Sept. 15, 1959

2,904,032

WEED BURNER

Harold S. Stanton, Shafter, Calif., assignor, by mesne assignments, to Research Corporation, New York, N.Y., a corporation of New York Application January 31, 1955, Serial No. 484,927

3 Claims. (Cl. 126—271.2)

This invention relates to a method and apparatus for burning weeds in row crops. The art of "flame cultivation" has been known for some time and involves generally the projection of a jet of flame toward the ground around the base of crop plants to burn and kill young weeds.

The present invention constitutes an improvement in methods and apparatus for "flame cultivation."

In general, the apparatus for practicing the method of this invention comprises a burner having a relatively flat and wide combustion chamber arranged generally horizontally with a horizontal elongated narrow outlet through which the flame jets. The flame issuing from the outlet immediately impinges on a deflector that deflects not only the top of the flame but also its side edges downwardly toward the ground while leaving the bottom of the flame free to expand downwardly. It has been found that this apparatus constitutes a convenient way of practicing the novel method wherein a thin boundary film of high velocity flame is produced along the upper and side edges of the jet to confine the flame against substantial upward or lateral expansion for an appreciable distance from the apparatus. By so limiting the upward and lateral expansion of the flame, it may be held close to the ground and thus minimize danger of damaging the leaves of the row crops.

The previously known apparatus for flame cultivation did not provide for confining the flame to a zone close to the surface of the ground, rather the flame was permitted free and unrestricted expansion in all directions. Due to this fact, prior methods of flame cultivation could not be employed on very young row crops since the crop plants themselves would be destroyed along with the weeds. It is well known that "flame cultivation" is effective only to kill weeds considerably younger and more tender than the crop plants themselves. Even with the prior methods of flame cultivation, which could not be practiced on young crops, it was necessary in many cases to first mechanically cultivate the soil to destroy the early weeds that were not much younger than the crop plants themselves. Such mechanical cultivation is time-consuming and expensive and results in uneven ground surface with its attendant disadvantages.

The method and apparatus of the present invention, on the other hand, by confining the weed burning flame to a relatively thin layer close to the ground surface, permits much earlier flame cultivation than has heretofore been possible and in many instances completely eliminates the need for mechanical cultivation during the tender youth of the crop plants. The row crops may be cultivated with the present apparatus at a much earlier age than heretofore possible.

It is therefore an object of this invention to provide an improved method and apparatus for burning weeds from row crops.

Another object of this invention is to provide novel apparatus for producing a weed burning flame, which apparatus is of extremely simple construction and economical to produce.

Still another object of this invention is to provide novel apparatus for producing a weed burning jet of flame confined to a relatively thin layer along the ground even at a substantial distance from the apparatus.

A further object of this invention is to provide a novel burner structure wherein the danger of flame blowout is eliminated.

A still further object of this invention is to provide a novel method of producing a weed burning flame jet.

Further and additional objects and advantages of the present invention will become apparent to those skilled in the art as the description proceeds in connection with the accompanying drawings, wherein:

Fig. 1 is a top plan view of one form of apparatus employed in practicing the present invention;

Fig. 2 is a side elevational view of the apparatus shown in Fig. 1;

Fig. 3 is a vertical sectional view, on an enlarged scale, taken substantially along the line 3—3 through one of the burners of Fig. 1;

Fig. 4 is a horizontal sectional view taken substantially along the line 4—4 of Fig. 3;

Fig. 5 is a vertical sectional view taken substantially along the line 5—5 of Fig. 4; and Fig. 6 is an end view of the burner of Fig. 3 as viewed from the plane 6—6 of Fig. 3.

Referring to Figs. 1 and 2, the rear portion A of a tractor or the like as shown in dotted lines. On a convenient portion of the tractor, for instance, the rear axle, a supporting frame 2 is mounted. The supporting frame 2 supports a tank 4 of suitable fuel. It is contemplated that the fuel employed be liquefied petroleum gas consisting of liquid propane or a mixture of propane and butane. However, for the purpose of this invention, any suitable fuel may be used. The supporting frame 2 also supports a transverse hollow header or manifold 6, the interior of which is supplied with fuel through a conduit 8 extending to the supply tank 4.

A plurality of brackets 10 are clamped in any suitable manner to the manifold 6 and each pivotally supports a trailing arm 12. The arms 12 are pivoted to the brackets 10 on pivot pins 14 and each arm 12 is provided with a gage shoe 16 pivoted to the lower end thereof and arranged to slide over the ground. Thus, the arms 12 and the burners mounted thereon are free to rise and fall as the shoes 16 slide over the ground to keep the burners at about the same distance above the ground surface at all times. Each of the arms 12 is provided with a pair of rings 18 welded thereto on opposite sides and to which articulated supporting arms 20 are clamped. The articulated arms 20 may be adjusted to any desired angle and pins 22 carried thereby may be clamped to the rings 18 in different positions of lateral adjustment by means of suitable U-bolts 24 and plates 25. The lowermost end of each of the articulated arms 20 is bent laterally and bolted to an upstanding ear 26 fixed to the upper surface of a burner 28. Obviously the apparatus may be provided with as many trailing arms 12 as desired and each of the arms except those at the extreme sides of the apparatus, is provided with two burners 28 facing in opposite directions. The outermost arms 12 are each provided with a single burner 28 directed inwardly whereby each of the rows of the crop is treated by a burner from each side thereof.

The above mounting apparatus is merely exemplary and may be modified at will.

One of the burners 28, constituting the novel apparatus of the present invention is shown in detail in Figs. 3 to 6, it being understood that all burners are alike. Conduits 30, preferably flexible, conduct fuel from the header 6 to nozzles 32 constituting a part of each of the burners 28.

Referring now particularly to Figs. 3 through 6 each burner 28 comprises a hollow structure having a top wall 34, a bottom wall 36, side walls 38, and a rear end wall 40. These walls define a relatively flat combustion chamber wherein the bottom wall 36 converges toward the top wall 34 toward an open end 42 constituting an outlet or jet orifice. Preferably, the bottom wall 36 is curved slightly in the region of the outlet 42 so that it diverges downwardly from the top wall 34 slightly in the region of the outlet to define an expansion nozzle for hot gases. In use, the combustion chamber portion of the burner is arranged generally horizontally and the top wall 34 thereof extends beyond the outlet 42 and is directed obliquely downwardly, as at 44. The side walls 38 extend downwardly below the bottom wall or baffle 36 and also extend outwardly beyond the outlet 42 to the same extent and in the same direction as the top wall extension 44. The top wall extension 44 and its sides 46 constitute an inverted U-shaped deflector to deflect flame issuing from the outlet 42 downwardly toward the ground.

The fuel nozzle 32 is of a type that projects a jet of fuel in a thin sheet of generally fan shape. That is, the jet of fuel issuing from nozzle 32 is very thin in a vertical direction and the side edges thereof (48 and 50 of Fig. 4) diverge outwardly away from each other in the direction of jet projection through the combustion chamber of the burner. The nozzle is so constructed and arranged that the fan-shaped jet of fuel impinges on the inner face of the top wall 34 just inside the outlet 42 and the angle of divergence between the edges 48 and 50 of the jet is such that the side edges of the jet first impinge on the side walls 38 of the combustion chamber in the region of the outlet 42, preferably only slightly inside that outlet.

The bottom wall or baffle 36 is provided with a pair of air inlet openings 52 therethrough in the opposite corners of the combustion chamber near the rear wall 40. Thus, the air inlet openings 52 are displaced laterally of the nozzle 32 and are sufficiently far back in the combustion chamber that air flowing through the openings to support combustion is not directed across the fuel jet in the region of the nozzle and thus eliminates the danger of the incoming air blowing out the flame. In operation, of course, the fuel jet is ignited and the flame thereof issues from the outlet 42 in the form of hot burning gases.

It has been found that with the apparatus described wherein the fanlike jet of fuel is directed in the manner described, the flame issuing from the outlet 42 is so deflected and redirected and confined by the deflector portions 44—46 that the upper surface of the flame and the side edges thereof develop high velocity films of flame gas traveling at much greater speed than the main portion of the flame. Those surfaces of the flame are positively confined by the walls 44 and 46 to a predetermined direction of flow and the natural tendency of the flame gases to expand causes an increase in their velocity since the expansion can be accommodated only by such an increase in velocity in the direction of the walls 44 and 46. The lower portion of the flame is free to expand downwardly. The dotted double line 54 (Figs. 3 and 6) indicates the layer or film of high velocity gases along the top surface of the jet, whereas the dotted line 56 indicates the lower edge of the high velocity films extending downwardly along the sides of the jet. The films 54 and 56, due to their high velocity, tend to continue traveling in the same direction after passing the end of the deflector 44—46 and thus act as a boundary film or confining layer preventing expansion of the main body of the flame in an upward or lateral direction while permitting free flame expansion downwardly.

It has been found that the method of confining the flame and the apparatus herein described for doing so are effective to confine the flame to a relatively thin layer extending along the surface of the ground for a very substantial distance from the end of the deflector and thus it is possible to flame cultivate crops of tender age wherein even the lowermost leaves are fairly close to the ground. The flame can thus be directed below the lowermost leaves to effectively kill young weeds without damage to the crop plants themselves.

As an example, suitable dimensions for the burner described are found to be as follows:

| | |
|---|---|
| Width of combustion chamber _____inches__ | 3¾ |
| Length of combustion chamber _____do____ | 5 |
| Vertical depth of combustion chamber at rear wall 40 _____inch__ | 1 |
| Vertical dimension of outlet 42 _____do____ | ⅜ |
| Radius of curvature of bottom wall 36 near outlet 42 _____inches__ | 2½ |
| Length of deflector walls 44 and 46 _____do____ | 4 |
| Angle between deflector wall 44 and the plane of top wall 34 _____degrees__ | 30 |

It has also been found that an efficient placement of the burner is with its combustion chamber extending generally horizontally and with the lowermost end of the deflector about four inches above the surface of the ground.

Tests were conducted with a burner constructed as set forth above wherein the burner was positioned with the deflector wall 44 extending horizontally and nozzle 32 supplied with fuel under a pressure of 30 lbs. per square inch. Temperature readings were taken in and adjacent the flame issuing from the deflector and a typical example of the results appears below:

| Horizontal distance from end of deflector | 4″ | 8″ | 12″ |
|---|---|---|---|
| 2″ above center of deflector, ° F | 300 | 350 | 550 |
| At center of deflector, ° F | 2,350 | 1,750 | 1,400 |
| 2″ below center of deflector, ° F | 1,650 | 2,200 | 1,800 |

It will be readily seen that there was very little flame expansion above the upper boundary of the deflector whereas the center of the flame and the area therebelow attained very high temperatures, indicating the direction and extent of flame expansion.

Another test was conducted wherein the deflector was tilted to the intended angle of use (about 30° from the horizontal) with its lowermost end about 4 inches above a horizontal rough steel plate. With fuel supplied to the nozzle under a pressure of 30 lbs. per square inch, temperature readings were taken at a horizontal distance of eight inches outwardly from the end of the deflector and it was found that at that distance a point one inch above the steel plate was at a temperature of 2400° F., a point 2¼ inches above the steel plate was at a temperature of 1600° F., whereas a point four inches above the steel plate was at a temperature of only 250° to 300° F.

Further tests have shown that the velocity of the boundary film of gases, as indicated by dotted line in Figs. 3 and 6, is from two to three times the velocity of the rest of the flame jet confined thereby.

While a single specific embodiment of the apparatus has been shown and described herein, it is to be understood that other modifications may be resorted to within the scope of the appended claims.

I claim:

1. In a weed burner, means defining a substantially closed combustion chamber having a horizontally elongated outlet at one end thereof, a fuel nozzle at the other end of said combustion chamber arranged to direct a fanlike jet to said outlet, and means arranged to direct flame from said outlet obliquely downwardly and thereby to produce an inverted U-shaped boundary film of high velocity gas confining the top and sides of said flame, said last-mentioned means comprising a downwardly sloping inverted U-shaped deflector open at its bottom and comprising an imperforate top wall and side walls extending downwardly therefrom, said top wall extending from the upper edge of said outlet, said side walls having greater depth than said outlet.

2. In a weed burner, means defining a substantially closed generally horizontal flat thin combustion chamber having top, bottom and side walls and being open at one end to define a horizontally elongated outlet, a fuel nozzle at the other end of said combustion chamber arranged to direct a thin, horizontally fanned jet to said outlet, a deflector having top and side walls extending from the top and side walls, respectively, of said combustion chamber extending obliquely downwardly from said outlet to define a downwardly directed and downwardly open inverted U-shaped flame deflector, the said side walls of said deflector being substantially parallel and of a height at least equal to the height of said outlet and the top wall thereof being imperforate.

3. A weed burner as defined in claim 2 wherein said top and bottom walls of said combustion chamber converge from said other end to said outlet, said bottom flaring downwardly and outwardly slightly from said top in the region of said outlet.

References Cited in the file of this patent

UNITED STATES PATENTS

| 228,131 | Smith | May 25, 1880 |
| 1,074,755 | Spira | Oct. 7, 1913 |
| 2,153,900 | Taber | Apr. 11, 1939 |
| 2,569,194 | Pool | Sept. 25, 1951 |

FOREIGN PATENTS

| 13,957 | Denmark | Dec. 5, 1910 |
| 12,277 | Great Britain | 1906 |
| 1,704 | Great Britain | 1912 |